United States Patent [19]

Campbell et al.

[11] Patent Number: 4,779,917
[45] Date of Patent: Oct. 25, 1988

[54] RECONFIGURABLE REAR SEAT FOR VAN OR STATION WAGON

[75] Inventors: Bruce R. Campbell, Escondido; John C. Toom, Alpine, both of Calif.

[73] Assignee: Nissan Design International, Inc., San Diego, Calif.

[21] Appl. No.: 98,545

[22] Filed: Sep. 17, 1987

[51] Int. Cl.$^4$ .............................................. B60N 1/02
[52] U.S. Cl. ...................................... 296/65.1; 296/69; 297/94; 297/284
[58] Field of Search ............... 296/65 R, 69; 297/92, 297/94, 95, 100, 119, 284, 313, 355; 180/326

[56] References Cited

U.S. PATENT DOCUMENTS

| | | | |
|---|---|---|---|
| D. 156,199 | 11/1949 | Cadwallader | 296/65 R X |
| 1,716,316 | 6/1929 | Lanning | 296/65 R |
| 2,771,124 | 1/1955 | Borsani | 297/313 |
| 3,188,133 | 6/1965 | Tewksbury | 296/65 R |
| 3,695,688 | 10/1972 | Wise | 297/92 |
| 3,856,347 | 12/1974 | Bell et al. | 297/92 |
| 3,955,846 | 5/1976 | Murphy | 296/65 R |
| 3,964,785 | 6/1976 | Plume | 297/64 |
| 4,085,962 | 4/1978 | Wahls | 296/65 R |
| 4,099,768 | 7/1978 | Amos | 297/63 |
| 4,157,797 | 6/1979 | Fox | 296/65 R X |
| 4,168,860 | 9/1979 | Garza et al. | 297/92 |
| 4,194,782 | 3/1980 | Itoh | 296/65 R |
| 4,322,052 | 3/1982 | Hodge et al. | 248/420 |
| 4,475,763 | 10/1984 | Hamatani et al. | 296/69 X |

FOREIGN PATENT DOCUMENTS

| | | | |
|---|---|---|---|
| 0226332 | 11/1985 | Japan | 296/69 |
| 415050 | 8/1934 | United Kingdom | 297/92 |

Primary Examiner—Robert B. Reeves
Assistant Examiner—John M. Gruber
Attorney, Agent, or Firm—Baker, Maxham & Jester

[57] ABSTRACT

A bench type rear seat has three sections independently movable about a common laterally extending pivot axis. The rear seat is positioned in a van or station wagon behind the front seat or seats where the driver sits. The sections include a pair of cushions that may function either as upright back rests, as posterior supports, or as bed cushions. The third section comprises a wrap around control bar that is used to establish the upright position of one of the cushions. By moving the sections, the seat can be configured so that passengers can face forwardly or rearwardly. The sections can also be moved to provide a flat bed. The wrap around control bar includes headrests and locking mechanisms for fixing the position of the upright back rest section. Adjustable headrests and arm rests are also provided. Shoulder type seat belts are connected to the control bar so that they may be used whether the seat is arranged for forward or rearward sitting. An integral lumbar support cushion may be folded down in both the forward and rearward facing configurations. The mounting position of the rear seat in the van or station wagon may be adjusted infinitely by sliding forward and back on tracks. The seat may be folded up and moved to a stowed position, e.g. directly behind the front seat.

10 Claims, 7 Drawing Sheets

RECONFIGURABLE REAR SEAT FOR VAN OR STATION WAGON

BACKGROUND OF THE INVENTION

The present invention relates to seating in passenger vehicles, and more particularly, to a rear seat for a van or station wagon type automobile that can be configured so that the passengers can face forwardly or rearwardly, or lowered to provide a bed, or collapsed into a compact configuration for storage.

It would be desirable to provide a reconfigurable rear seat for a van or station wagon that can be readily adjusted so that passengers seated thereon can face either forwardly or rearwardly. Where there are two rear seats, configuring the two rear seats to allow the passengers seated thereon to face each provides a limousine style of seating. It would also be desirable in such vehicles to allow the rear seat or seats to be folded down into a horizontal configuration to provide a bed. It would be still further desirable to provide the capability for folding up such a rear seat so that it will occupy a minimum amount of space, thereby maximizing the cargo area.

In achieving the forgoing objectives, the re-configuragble seat must still meet the same requirements of conventional automobile seats. The reconfigurable seat must provide for seat belts, preferably of the shoulder type for maximum safety. The mechanisms that allow for reconfiguration must be simple, fast and reliable, yet durable and not subject to failures. Comfort must not be sacrificed for the reconfiguration capabilities.

U.S. Pat. No. 1,716,316 of Lanning discloses a seat rollable on channels inside an automobile. FIG. 4, and column 4, lines 76-84 indicate that the seat back 50 can be fixed in sockets 61 at the front of the seat to allow rearward facing seating.

U.S. Pat. No. 3,188,133 of Tewksbury discloses a removable and reversible seat for the trunk of a sedan type automobile.

U.S. Pat. No. 3,695,688 of Wize discloses a rear seat for a station wagon having a special linkage which permits the movement of the seat back and seat cushions between forward and rearward facing configurations, to an overlying configuration to provide a cargo area.

U.S. Pat. No. 3,856,347 of Bell et al. discloses a reversible seat structure made of a tubular framework and slotted brackets adjacent the hinge axis to adjust inclination.

U.S. Pat. No. 3,955,846 of Murphy discloses a reversible seat structure with a releasable lock assembly with upright support members which engage pins in the legs to hold the frame in first and second seating positions.

U.S. Pat. No. 3,964,785 of Plume discloses a pair of reversible bench type seats, one of which is longitudinally adjustable relative to the floor of the vehicle, which can be flattened and combined to form a bed. A mechanism is provided for giving the desired seat bottom rake of the seat cushions in either the forward or rearward orientation.

U.S. Pat. No. 4,099,768 of Amos discloses a convertible seat bed system similar to that of the aforementioned Plume patent.

U.S. Pat. No. 4,168,860 of Garza et al. discloses a particular construction for a locking mechanism for a reversible bench seat.

U.S. Pat. No. 4,194,782 of Itoh discloses a folding seat design for a van.

U.S. Pat. No. 4,322,052 of Hodge et al. discloses an improved latch assembly for a reversible seat.

SUMMARY OF THE INVENTION

It is therefore the primary object of the present invention to provide an improved seat for a van, station wagon or other type of passenger automobile.

It is another object of the present invention to provide an improved seat for an automobile that can be readily adjusted between forward and rearward facing seating configurations.

It is another object of the present invention to provide an improved seat for an automobile that can be readily adjusted between flat bed and compact stowage configurations, in addition to forward and rearward facing seating configurations.

It is another object of the present invention to provide an improved seat for an automobile that can be readily readjusted between forward and rearward facing seating configurations while permitting the use of the same shoulder type seat belt in either configuration.

It is another object of the present invention to provide a reconfigurable seat for an automobile which is simple to adjust, durable and comfortable.

The present invention comprises a reconfigurable seat mountable on the floor of a passenger vehicle. A mechanism is provided for supporting first and second cushions for pivotal movement about a horizontal axis extending in a lateral direction relative to a longitudinal axis of the vehicle. A control arm is connected to the supporting mechanism and is pivotal about the horizontal axis around a either of the first and second cushions for establishing an angular position of the cushion relative to the supporting mechanism. A first latching mechanism releasably locks the control arm to the cushion it surrounds. A second latching mechanism releasably locks the control arm in one of a plurality of angular positions relative to the supporting mechanism and includes at least a forward facing backrest position and a rearward facing backrest position. Structure is provided for establishing a rake position of the other cushion relative to the supporting mechanism. The first and second cushions may be alternately positioned to form a backrest and a seat bottom and visa versa for allowing a passenger to sit in either a forward or a rearward facing direction relative to the longitudinal axis of the vehicle.

In the illustrated embodiment of the present invention a bench type rear seat has three sections independently movable about a common laterally extending pivot axis. The rear seat is positioned in a van or station wagon behind the front seat or seats where the driver sits. The sections include a pair of cushions that may function either as upright back rests, as posterior supports, or as bed cushions. The third section comprises a wrap around control bar that is used to establish the upright position of one of the cushions. By moving the sections, the seat can be configured so that passengers can face forwardly or rearwardly. The sections can also be moved to provide a flat bed. The wrap around control bar includes headrests and locking mechanisms for fixing the position of the upright back rest section. Adjustable headrests and arm rests are also provided. Shoulder type seats belts are connected to the control bar so that they may be used whether the seat is arranged for forward or rearward seating. An integral lumbar support cushion may be folded down in both the forward and rearward facing configurations. The mounting position of the rear seat in the van or station wagon may be adjusted infinitely by sliding forward and back on tracks. The seat may be folded up and moved to a stowed position, e.g. directly behind the front seat.

DESCRIPTION OF THE PREFERRED EMBODIMENTS

Figure 1:
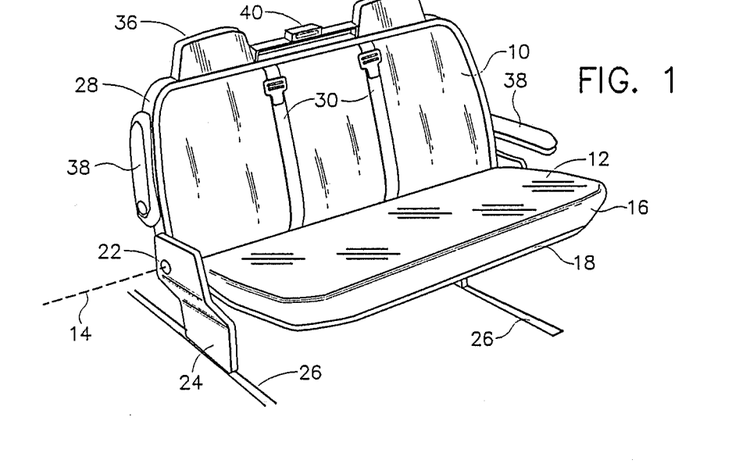
FIG. 1 is a perspective view of a preferred embodiment of our reconfigurable seat adjusted to allow passengers to sit thereon in a forward facing direction.
Figure 11:
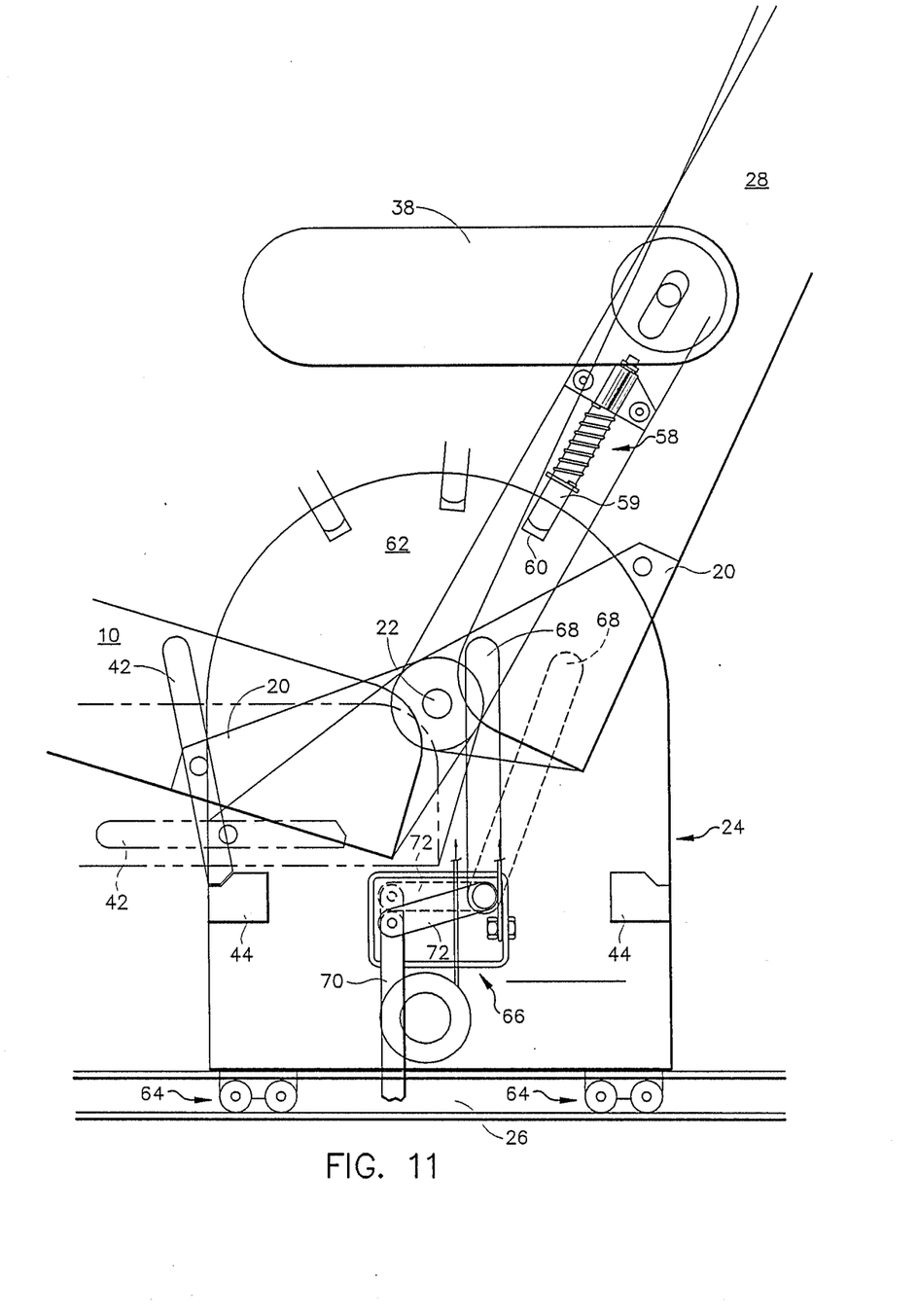
FIG. 11 is an enlarged diagrammatic illustration of a version of our seat similar to that illustrated in FIGS. 1-4 showing the various adjustment and locking mechanisms.

Referring to FIG. 1, a reconfigurable seat comprises a first cushion 10 and a second cushion 12 mounted for pivotal movement around a horizontal axis 14 extending in a lateral direction relative to a longitudinal axis of a van, station wagon or other passenger vehicle. As explained more fully hereafter, each of the cushions 10 and 12 alternately functions as either a backrest or a seat bottom. Each of the cushions includes padding 16 supported by a rigid frame 18. Support plates 20 (FIG. 11) connected to the opposite ends of the seat frames 18 are journaled about shafts 22 carried by vertical supports 24 (FIG. 1) at each end of the seat. The supports 24 are in turn releasably connected to a pair of spaced apart tracks 26 extending longitudinally along the floor of the vehicle.

Figure 2:
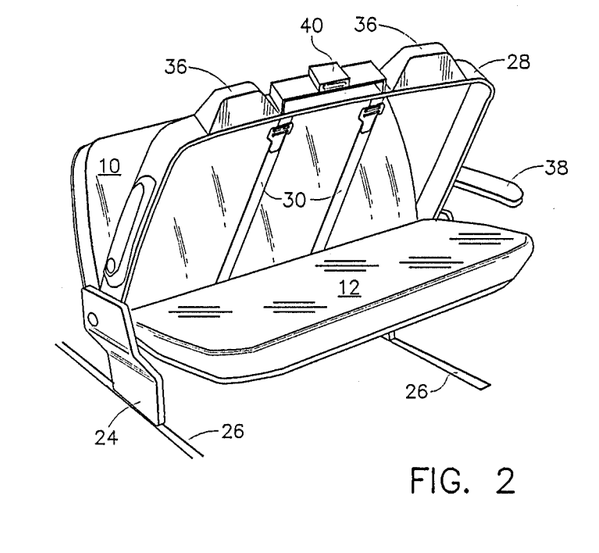
FIG. 2 is a perspective view of the seat of FIG. 1 with its control bar tilted forwardly.

A wrap around control arm 28 (FIG. 2) is pivotally connected to the supports 24 for movement about the same horizontal axis 14 (FIG. 1) as the cushions 10 and 12. The control arm has a generally U-shaped configuration and its legs are journaled about the same shafts 22 (FIG. 11) as the frames of the cushions. The control arm 28 is shaped and dimensioned so that it conforms to the outer periphery or contour of either of the cushions, 10 and 12, which are substantially identical to each other. Thus, the control arm 28 can pivot about the axis 14 around either of the cushions or between the same, as will be apparent by inspecting FIGS. 1 and 2. The control arm is preferably made of metal so that it will have sufficient rigidity and strength for enabling the functions hereafter described.

A pair of shoulder harness type seat belts 30 (FIG. 2) are each threaded through corresponding steel loops (not visible) connected to the inner side of the control arm. Spring retracting mechanisms (not visible) connected to the lower ends of each of the seat belts are in turn connected to the steel cross-beam 34 connecting the vertical supports 24.

A pair of head rests 36 and a pair of arm rests 38 are adjustably mounted to the outer sides of the control arm 28. Details of these constructions are visible in FIGS. 10a and 11.

Reconfiguring the seat from a forward facing configuration to a rearward facing configuration can now be described. Referring to FIG. 1, a first latch means hereafter described is operated by pulling upwardly on a handle 40 to unlock the control arm from the frame of the cushion 10. A second latch means hereafter described is then operated by twisting the handle 40 to unlock the control arm from the supports 24. This allows the control arm to be swung away from its forward facing backrest position in which it surrounds the cushion 10 (FIG. 1) to a rearward facing backrest position illustrated in FIG. 2 where it is once again locked to the supports 24. The handle 40 is again twisted to lock the control arm 28 into this new position.

Figure 3:
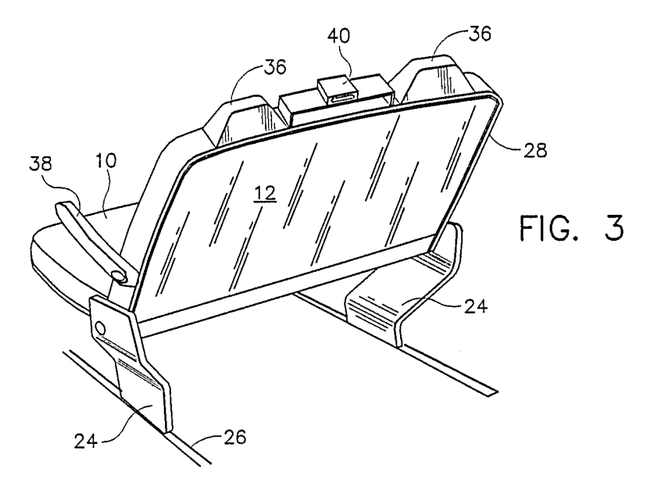
FIG. 3 is a perspective view of the seat of FIG. 2 with the former posterior seat cushion raised to function as the upright back rest and with the former back rest cushion lowered to function as the new posterior support cushion.

Continuing with a description of the reconfiguration, the cushion 10 is swung downwardly (FIG. 3) and a pair of levers 42 (FIG. 11) connected to the support plates 20 on each end of the cushion frame are pivoted to nearly vertical positions as illustrated. The lower ends of these levers engage stops 44 connected to the supports 24 to establish an inclined or "rake" position of the cushion 10 which is most comfortable for sitting. Referring again to FIG. 3, the cushion 12 is swung upwardly, its rake establishing levers (not shown) are folded in, and it is moved inside of the control arm. The handle 40 is pulled out during this process to permit the cushion 12 to move into a position in which the control arm 28 surrounds the same. The handle 40 is then released to lock the cushion 12 to the control arm, thereby establishing the cushion 12 as the new backrest. The headrests 36 and arm rests 38 are pivoted to accommodate the new rear facing configuration. It will be understood that the seat belts 30 always end up lying accessible on the side of the new backrest cushion facing the passenger because they are connected to the control arm. Thus it is not necessary to have two different sets of seat belts, one for the forward facing configuration and one for the rearward facing configuration.

Figure 4:
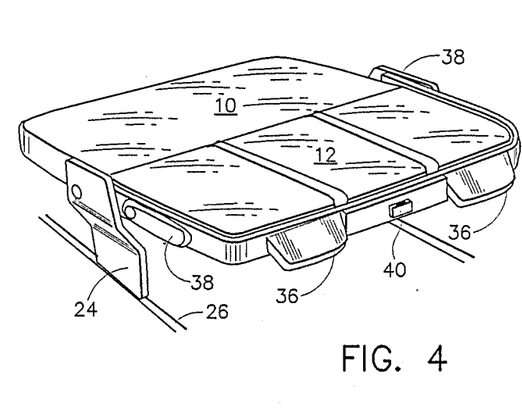
FIG. 4 is a perspective view of the seat of FIG. 1 with both the cushions and the control bar lowered to horizontal positions to provide a flat bed.

Referring to FIG. 4, the handle 40 may be operated to place both the cushions 10 and 12 and the control arm 28 into horizontal reclined positions. This enables the seat to form a flat bed.

Figures 10A, 14:
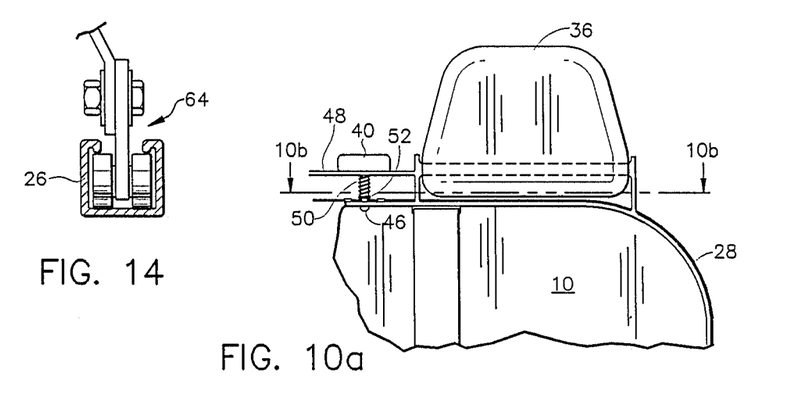
FIG. 10a is an enlarged fragmentary front elevation view of the upper right corner of the seat of FIG. 1 illustrating details of the control arm, control handle and head rest.
FIG. 14 is a greatly enlarged end view of the side roller assembly of FIG. 13.

Referring to FIG. 10a, the handle 40 is rigidly connected to the upper end of a rod 46 journaled for axial sliding movement and rotational movement in a hole in a bracket 48 connected to the control arm intermediate its length. The rod 46 also slides and rotates in an aligned hole in the main portion of the control arm 28. The distal or lower end of the rod 46 (illustrated in phantom lines) is insertable in a corresponding hole in the metal frame 18 of either cushion to lock it to the control arm 28. A spring 50 surrounds the intermediate segment of the rod 46 and is compressed between the bracket 48 and a retaining ring 52. The handle 40 can be manually grasped and pulled upwardly, away from the control arm 28 to compress the spring 50 and withdraw the rod 46 from the frame 18 of the aligned cushion.

Figure 10B:
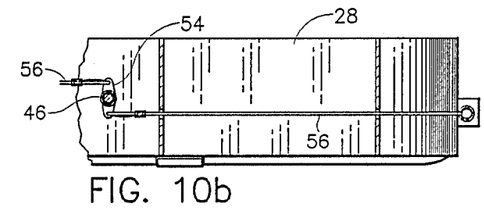
FIG. 10b is an enlarged fragmentary top elevation view of the upper right corner of the seat of FIG. 1 illustrating further details of the control arm, control handle and cable linkage.

Referring to FIG. 10b, a bell crank 54 is rigidly connected to the rod 46 for rotation therewith and has a pair of linkage cables 56 connected to the opposite peripheries thereof. These cables extend through suitable guides along the outer sides of the control arm to corresponding spring biased locking pin assemblies 58 (FIG. 11) on each side of the seat. By manually twisting the handle 40, the cables 56 are simultaneously pulled to withdraw the control arm pins 59 of the assemblies 58 from corresponding radially extending holes 60 spaced along the periphery of arcuate frame pieces 62 inside the supports 24. This allows the control arm 28 to be moved until the control arm pins 59 register with the new holes 60 that will establish the new desired angular position for the control arm. The handle 40 can then be allowed to return to its normal transverse position illustrated in FIG. 10a, causing the springs of the assemblies 58 to drive pins 59 into the new holes 60 in the arcuate frame pieces 62, thereby locking the control arm 28 into its new position.

Figure 13:
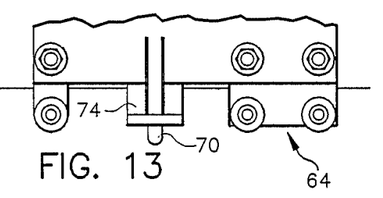
FIG. 13 is a greatly enlarged side elevation view of a side roller assembly.

Each of the supports 24 is provided with roller assemblies 64 (FIGS. 11 and 13) illustrating two different types. As best seen in FIG. 14, the roller assemblies are captured inside the tracks 26 which are channel shaped in cross-section to prevent the seat from lifting out of the tracks, which are in turn bolted, welded, or otherwise fixed to the floor of the vehicle. A position locking mechanism 66 (FIG. 11) is mounted to one of the side supports 24 for releasably locking the seat at preselected longitudinal positions along the tracks 26. The position locking mechanism 66 includes a spring biased lever 68 which may be pivoted to raise and lower a locking pin 70 via link arm 72. The lower end of the locking pin 70 is guided through a hole in a guide bracket 74 (FIG. 13) connected to the side support 24 into a selected one of a plurality of longitudinally spaced holes in the adjacent track 26. Thus, the lever 68 can be manually moved to unlock the seat from the track, allowing it to be rolled forwardly or rearwardly on the tracks 26 to select a new position for the seat in the vehicle. The lever 68 may be thereafter released to drop locking pin 70 into a new hole in the associated track 26 to lock the seat in its new longitudinal position inside the vehicle.

Figure 5A:
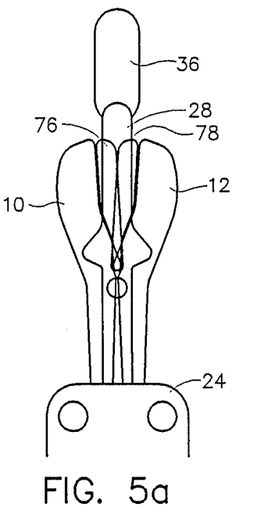
FIGS. 5a-5d are a series of diagrammatic end view of a slightly different version of our rear seat illustrating the various positions of its sections and lumbar supports.
Figure 5B:
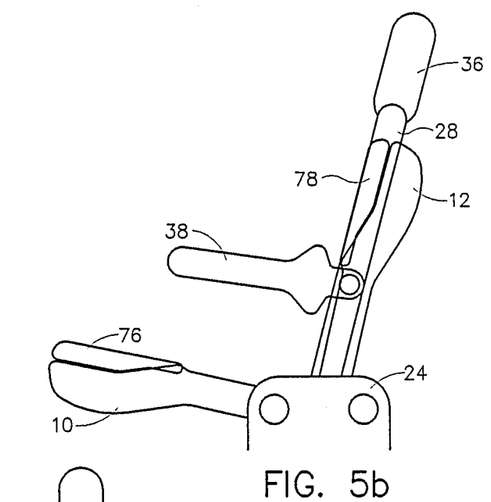
Figure 5C:
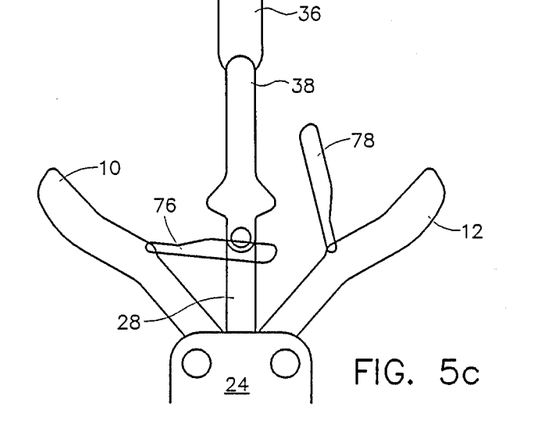
Figure 5D:
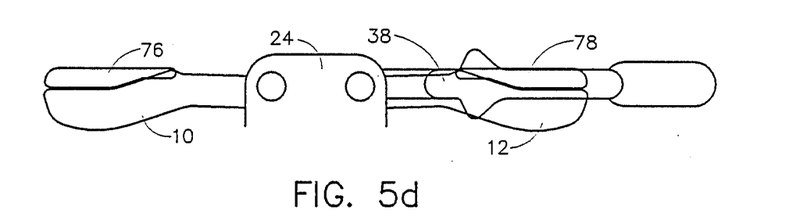
Figure 6A:
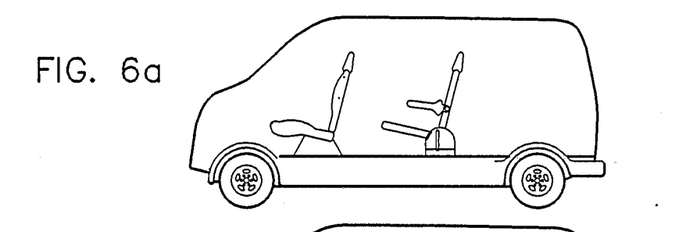
FIGS. 6a-6e are a series of diagrammatic end views illustrating the various configurations and placements of the seat of FIGS. 5a-5d behind the front seat of a van.
Figure 6B:
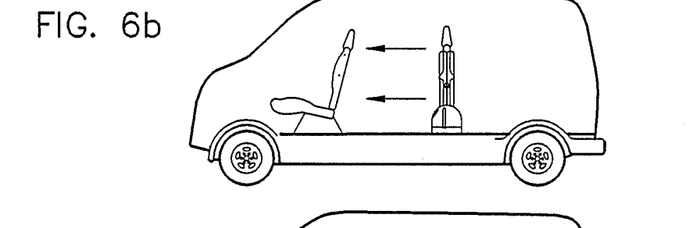
Figure 6C:
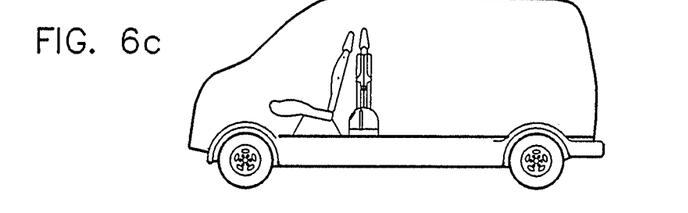
Figure 6D:
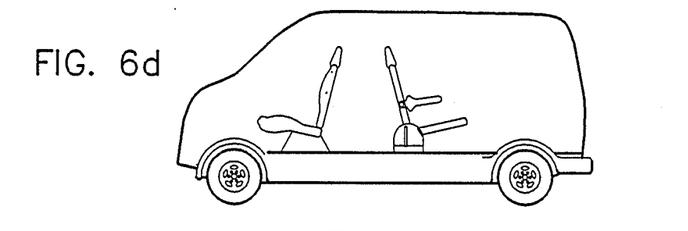
Figure 6E:
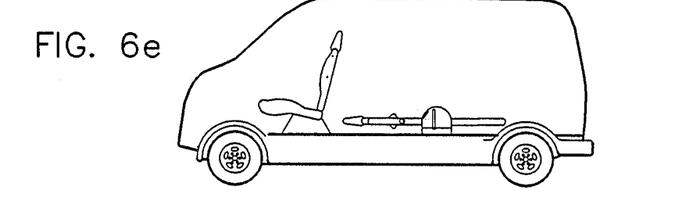

Referring to FIGS. 5a-5d, our seat may have extensible lumbar supports 76 and 78 pivotally connected to each of the seat cushions. When a cushion is functioning as a backrest, its lumbar support may be pivoted downwardly to provide better low back support. The lumbar support comprises a smaller rectangular cushion section that can be pulled out of the larger central area of the main cushion itself. When retracted, it fits flush into the main cushion. FIG. 5a illustrates a folded up configuration of our seat that allows it to be moved to a stowed position, directly behind the front seat, thereby maximizing the available cargo space behind the same. FIG. 5d illustrates a folded down configuration of the seat that provides a flat bed.

Figure 7:
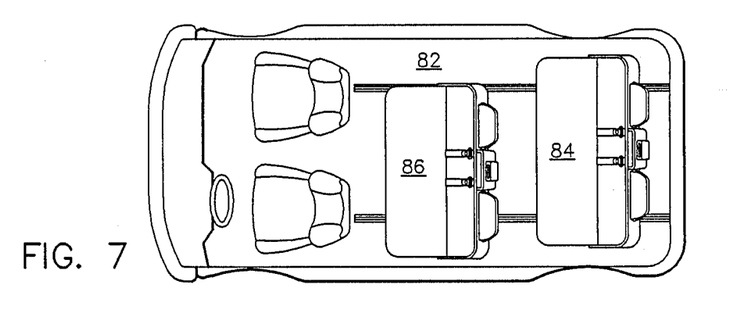
FIG. 7 is a top plan view of a van with a pair of the seats of the type illustrated in FIGS. 1-4 mounted therein, both facing forwardly.
Figure 8:
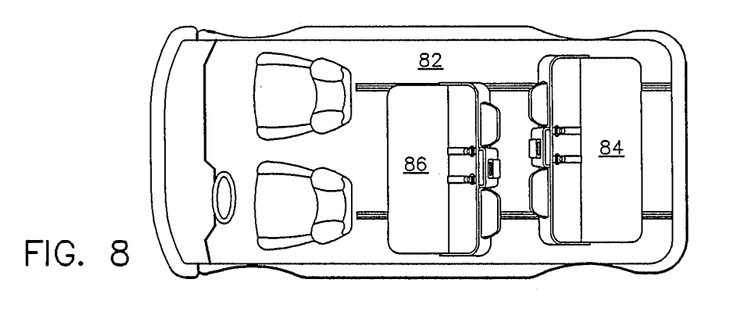
FIG. 8 is a top plan view similar to FIG. 7 but with the seats facing opposite directions.
Figure 9:
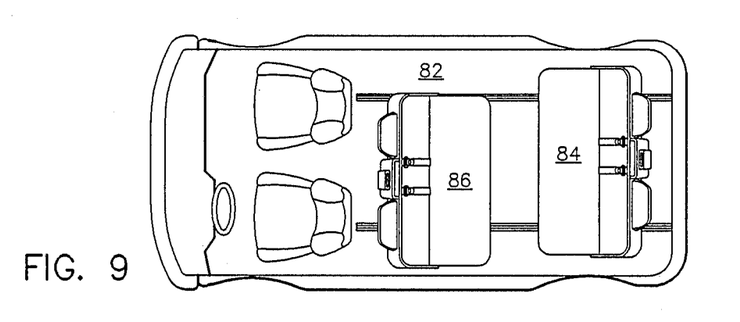
FIG. 9 is a top plan view similar to FIG. 7 but with the seats facing each other to provide limousine style seating.

FIGS. 6a-6e illustrate various configurations and longitudinal placements of the seat of FIGS. 5a-5d and require no further explanation. FIGS. 7-9 are top plan views of a van similarly illustrating the various configurations and longitudinal placements of a pair of the seats of the type illustrated in FIGS. 1-4 and require no further explanation.

Figure 12:
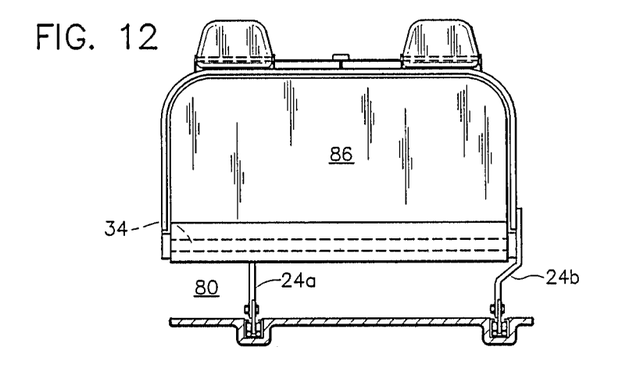
FIG. 12 is a simplified illustration of the asymmetric mounting of the rollers of the seat of FIGS. 1-4.

Referring to FIG. 12, the seat may have an asymmetric configuration to facilitate passenger walking past one end thereof when it is mounted intermediate the front and rear most seats in a three seat van. More specifically, the vertical supports 24a and 24b may be positioned and configured so that the seat is close to the driver's side of the vehicle body, leaving an unobstructed area 80 underneath the seat bottom. This asymmetry also provides an isle 82 (FIG. 7) allowing ingress and egress to a rear seat 84 behind a forward seat 86 in a van. The unobstructed area 80 lies adjacent the isle 82 and provides extra clearance for the feet of the passengers walking through the isle to the rear seat 84. FIG. 12 is a view of the forward one 86 of the two rear seats looking rearwardly from the front of the vehicle.

Having described preferred embodiments of the reconfigurable seat in detail, it will be apparent to those skilled in the art that our invention can be modified in both arrangement and detail. Therefore, the protection afforded our invention should only be limited in accordance with the scope of the following claims.

We claim:

1. A reconfigurable seat mountable on the floor of a passenger vehicle, comprising:
   a first cushion;
   a second cushion;
   means for supporting the first and second cushions for pivotal movement about a horizontal axis extending in a lateral direction relative to a longitudinal axis of the vehicle;
   control arm means connected to the supporting means and pivotal about the horizontal axis around a selected one of the first and second cushions for establishing an angular position of the one cushion relative to the supporting means;
   first latching means for releasably locking the control arm means to the one cushion;
   second latching means for releasably locking the control arm means in one of a plurality of angular positions relative to the supporting means including at least a forward facing backrest position and a rearward facing backrest position; and
   means for establishing a rake position of the other one of the cushions relative to the supporting means;
   whereby the first and second cushions may be alternately positioned to form a backrest and a seat bottom and visa versa for allowing a passenger to sit in either a forward or a rearward facing direction relative to the longitudinal axis of the vehicle.

2. A seat according to claim 1 and further comprising:
   means for mounting the supporting means to the floor of the vehicle including a pair of spaced apart tracks extending longitudinally along the floor and means for releasably connecting the supporting means at preselected locations along the tracks.

3. A seat according to claim 1 wherein the first latching means includes a handle and a rod slidable in a hole in the control arm to engage a corresponding hole in one of the cushions.

4. A seat according to claim 3 wherein the second latching means includes linkage means connected to the rod and operable by rotation of the handle.

5. A seat according to claim 1 wherein the plurality of angular positions includes a pair of fully reclined positions, one for each of the cushions.

6. A seat according to claim 1 wherein the supporting means is asymmetric to thereby provide an isle for passenger egress when the seat is mounted on the floor of the passenger vehicle.

7. A seat according to claim 1 wherein at least one of the cushions has an extensible lumbar support.

8. A seat according to claim 1 and further comprising:
   means for providing a shoulder type seat belt useable by the passenger sitting in either the forward facing or rearward facing directions.

9. A seat according to claim 1 and further comprising:
   at least one head rest; and
   means for adjustably mounting the head rest to the control arm.

10. A seat according to claim 1 and further comprising:
   means mounted on the control arm means for operating the first and second latching means.

* * * * *

UNITED STATES PATENT AND TRADEMARK OFFICE
CERTIFICATE OF CORRECTION

PATENT NO. : 4,779,917

DATED : October 25, 1988

INVENTOR(S) : Bruce R. Campbell, Gerald P. Hirshberg and John C. Toom

It is certified that error appears in the above-identified patent and that said Letters Patent is hereby corrected as shown below:

On the face of the patent, the inventors should be:

--Bruce R. Campbell, Escondido; Gerald P. Hirshberg, Del Mar; and John C. Toom, Alpine, all of California--

Signed and Sealed this

Seventh Day of March, 1989

Attest:

DONALD J. QUIGG

Attesting Officer

Commissioner of Patents and Trademarks